US006999193B2

(12) United States Patent
Le et al.

(10) Patent No.: US 6,999,193 B2
(45) Date of Patent: Feb. 14, 2006

(54) COMPUTER GENERATED REPORT PRINTING METHOD AND SYSTEM

(75) Inventors: Hanh Kim Le, Austin, TX (US); Gongxian Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 09/820,518

(22) Filed: Mar. 29, 2001

(65) Prior Publication Data

US 2002/0140980 A1    Oct. 3, 2002

(51) Int. Cl.
G06F 15/00    (2006.01)
(52) U.S. Cl. .................................... 358/1.18; 358/1.11
(58) Field of Classification Search ............... 358/1.12, 358/1.13, 1.14, 1.15, 1.18, 1.11, 1.1; 707/1, 707/101; 709/201, 203
See application file for complete search history.

(56) References Cited

U.S. PATENT DOCUMENTS

| | | | |
|---|---|---|---|
| 4,460,975 A | | 7/1984 | Torkelsen et al. |
| 5,097,418 A | | 3/1992 | Nurse et al. |
| 5,267,155 A | | 11/1993 | Buchanan et al. |
| 5,619,635 A | | 4/1997 | Millman et al. |
| 5,664,182 A | * | 9/1997 | Nierenberg et al. ......... 707/102 |
| 5,732,221 A | | 3/1998 | Feldon et al. |
| 5,787,278 A | | 7/1998 | Barton et al. |
| 5,832,532 A | | 11/1998 | Kennedy et al. |
| 5,937,155 A | | 8/1999 | Kennedy et al. |
| 6,014,630 A | | 1/2000 | Jeacock et al. |
| 6,085,199 A | | 7/2000 | Rose |
| 6,125,391 A | | 9/2000 | Meltzer et al. |
| 6,341,286 B1 | * | 1/2002 | Kawano ...................... 707/101 |
| 6,613,099 B2 | * | 9/2003 | Crim ........................... 715/523 |
| 6,801,926 B1 | * | 10/2004 | Shisler et al. ............... 709/201 |

FOREIGN PATENT DOCUMENTS

JP    3-146856    6/1991

OTHER PUBLICATIONS

Article entitled "Method for Automatically Printing Variable Content Labels On-Line", (Author Unknown), pp. 230-236, IBM Technical Disclosure Bulletin, vol. 33, No. 8, Jan. 1991.
Article entitled "Utilization of High Speed Printer Capabilities in a Word Processing System", (Authors, J. G. Barnes, R. E. Chukran, J. L. Gaudet, G. E. Hayes and G. H. Neuman, pp. 3794-3797, IBM Technical Disclosure Bulletin, vol. 27 No. 7A, Dec. 1984.).

* cited by examiner

*Primary Examiner*—Mark Wallerson
(74) *Attorney, Agent, or Firm*—Cardinal Law Group; David A. Mims, Jr.

(57) ABSTRACT

A system generates the report to include a header section representing information, a parts section listing line items, and a footer section representing information. The system prints a first page of the report including the header section, a first parts subsection, and the footer section. The first parts subsection lists a quantity of line items that is less than or equal to a first number. The system prints any additional pages of the report to include a header subsection, subsequent parts subsection, and a footer subsection. The header subsection represents a portion of the information represented by the header section, and the footer subsection represents a portion of the information represented by the footer section. The subsequent parts subsection(s) lists a quantity of line items that is less than or equal to a second number.

6 Claims, 12 Drawing Sheets

COMPUTER GENERATED REPORT PRINTING METHOD AND SYSTEM

BACKGROUND OF THE INVENTION

1. Field of the Invention

The present invention generally relates to the printing of computer generated reports. The present invention specifically relates to a user friendly printing format for generating computer reports.

2. Description of the Related Art

Referring to FIG. 1A, a computer generated Return Equipment Material Report (RMER) 10 including a header section 20, a replacement parts section 30 listing line items 31a–31t, and a footer section 40 is shown. Header section 20 presents shipping information related to a customer, such as, for example, customer number, division number, address, etc. Line times 31a–31t consists of information related to a particular part, such as, for example, a part number, a quantity, a serial number, etc. Footer section 40 presents shipping information related to a shipping department, such as, for example, number of items shipped, date, shipment verification, etc.

Prior to the present invention, a printout of RMER 10 was based on the contents of RMER 10 being displayed in a display window of a computer monitor. Thus, the overall length of RMER 10 relative to a length of each display window was a determining factor as to the number of printed pages of RMER 10. For example, a prior art printout of RMER 10 consists of a printed page P1 as shown in FIG. 1B that corresponds to a parts subsection 30a listing line items 31a–31h as displayed in a display window 50a as shown in FIG. 1A. A printed page P2 as shown in FIG. 1C corresponds to a parts subsection 30b listing line items 31i–31g being displayed in a display window 50b of RMER 10 as shown in FIG. 1A. And, a printed page P3 as shown in FIG. 1D corresponds to a parts subsection 30c listing line items 31r–31t being displayed in a display window 50c of RMER 10 as shown in FIG. 1A.

Referring to FIGS. 1B–1D, a problem of printed pages P1–P3 occurs when printed pages P1–P3 are separated. Specifically, the ability to determine that printed pages P1–P3 are collectively representative of RMER 10 is diminished when printed pages P1–P3 are separated due to the lack of mutual identifying information on printed pages P1–P3. Consequently, to obtain mutually identifying information on each printed page, a user of a system for generating RMER 10 was forced to initially input line items 31a–31g, and then a print page P4 as shown in FIG. 1E. The user subsequently deleted line items 31a–31g, inputted line items 31h–31n, and then printed a page P5 including a parts subsection 30d listing line items 31h–31n as shown in FIG. 1F. The user subsequently deleted line items 31h–31n, inputted line items 31o–31t, and then printed a page P6 including a parts subsection 30e listing line items 31a–31t as shown in FIG. 1G.

A user of the prior art system for generating RMER 10 can input mistakes whereby the user may have to re-print each required page of RMER 10 when the mistake significantly shifts the line items 31 within parts section 30. Additionally, if the user wants to have the ability to edit each printing page, the user has to save each printed page as a separate file as opposed to one file for RMER 10. Thus, the prior art approach for generating and printing RMER 10 was inefficient and inconvenient. The present invention addresses the problems with the prior art.

SUMMARY OF THE INVENTION

The present invention relates to a computer-generated report printing method and system that overcomes the disadvantages associated with the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a method for printing a computer generated report including a header section presenting a first set of information, a parts sections listing one or more line items, and a footer section presenting a second set of information. A first report page including the header section, a first parts subsection, and the footer section is printed. The parts subsection lists a quantity of line items wherein the quantity is less than or equal to a first number. A second reported page including a header subsection, a second parts subsection, and a footer subsection is printed when the total quantity of line items listed in the parts section exceeds the first number. The second parts subsection lists a quantity of line items wherein the quantity is less than or equal to a second number. The header subsection presents a portion of the first set of information presented on the header section. The footer subsection presents a portion of the second set of information presented on the footer section.

A second form of the present invention is a system for printing a computer generated report including a header section presenting a first set of information, a parts sections listing one or more line items, and a footer section presenting a second set of information. The system comprises a pair of printing means. The first printing means is for printing a first report page including the header section, a first parts subsection, and the footer section. The parts subsection lists a quantity of line items and the quantity is less than or equal to a first number. And, a means for printing a second page including a header subsection, a second parts subsection, and a footer subsection is printed when the total quantity of line items listed in the parts section exceeds the first number. The second parts subsection lists a quantity of line items wherein the quantity is less than or equal to a second number. The header subsection presents a portion of the first set of information presented on the header section. The footer subsection presents a portion of the second set of information presented on the footer section.

A third form of the present invention is a computer program product in a computer readable medium for printing a computer generated report including a header section presenting a first set of information, a parts sections listing one or more line items, and a footer section presenting a second set of information. The computer program product comprises a pair of computer readable codes. The first computer readable code is for printing a first report page including the header section, a first parts subsection, and the footer section. The parts subsection lists a quantity of line items and the quantity is less than or equal to a first number. The second computer readable code is for printing a second page including a header subsection, a second parts subsection, and a footer subsection is printed when the total quantity of line items listed in the parts section exceeds the first number. The second parts subsection lists a quantity of line items wherein the quantity is less than or equal to a second number. The header subsection presents a portion of the first set of information presented on the header section.

The footer subsection presents a portion of the second set of information presented on the footer section.

The foregoing forms and other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 2:
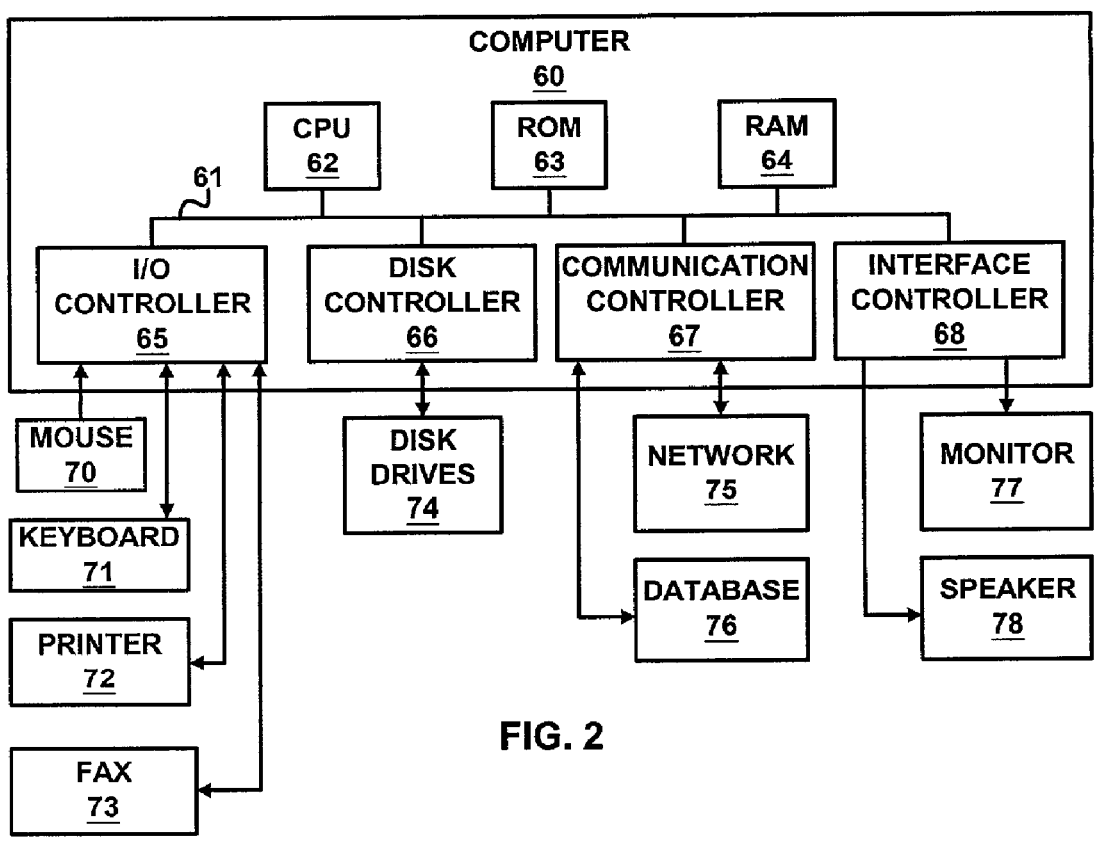
FIG. 2 is a block diagram of one embodiment of computer hardware in accordance with the present invention.
Figure 3:
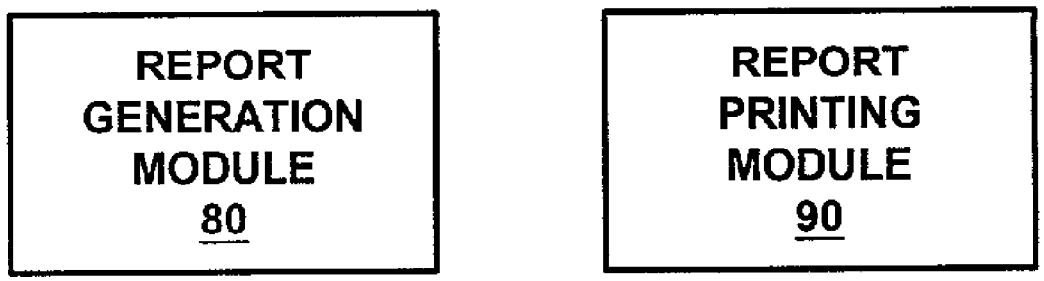
FIG. 3 is a block diagram of one embodiment of computer software in accordance with the present invention.
Figure 4:
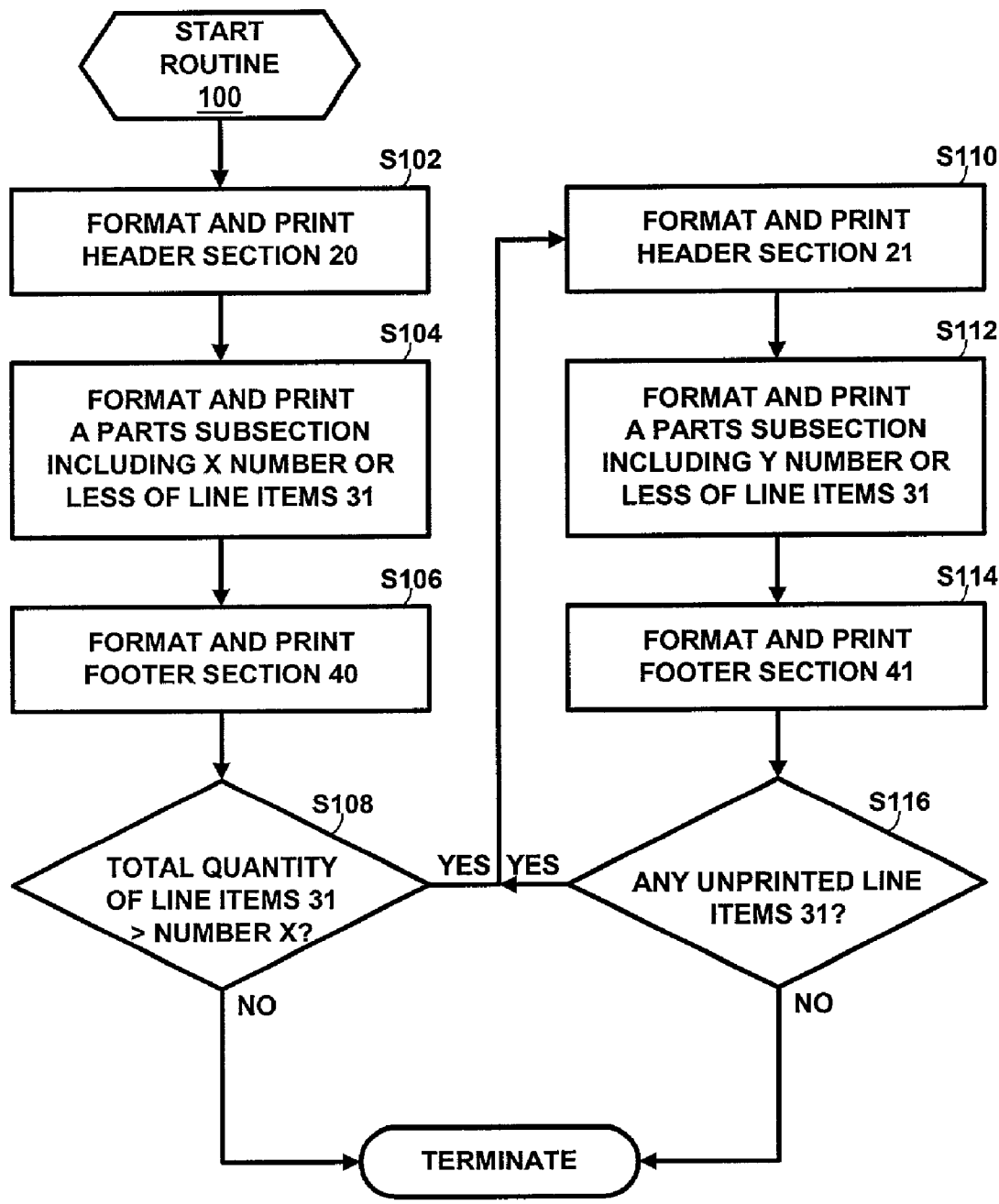
FIG. 4 is a flow chart of a report printing routine in accordance with the present invention.

Referring to FIGS. 2 and 3, a system in the form of a computer 60 for executing a report generation module 80 and a report print module 90 is shown. Computer 60 includes a bus 61 for facilitating electrical communication among a central processing unit (CPU) 62, a read-only memory (ROM) 63, a random access memory (RAM) 64, an input/output (I/O) controller 65, a disk controller 66, a communication controller 67, and a user interface controller 68. CPU 62 is preferably one of the Intel families of microprocessors, one of the Motorola families of microprocessors, or one of the various versions of a Reduced Instruction Set Computer microprocessor such as the PowerPC chip manufactured by IBM. ROM 63 permanently stores a conventional operating system and various controlling programs such as the Basic Input-Output System (BIOS) developed by IBM. RAM 64 is the memory for loading the operating system and selectively loading the controlling programs.

Controller 65 is an aggregate of controllers for facilitating an interaction between CPU 62 and pointing devices such as a mouse 70 and a keyboard 71, and between CPU 62 and output devices such as a printer 72 and a fax 73. Controller 66 is an aggregate of controllers for facilitating an interaction between CPU 62 and data storage devices such as disks drives 74 in the form of a hard drive, a floppy drive, a local drive, and a compact-disc drive. Controller 67 is an aggregate of controllers for facilitating an interaction between CPU 62 and a network 75, and between CPU 22 and a database 76. Controller 68 is an aggregate of controllers for facilitating an interaction between CPU 62 and a graphic display device such as a monitor 77, and between CPU 62 and an audio device such as a speaker 78.

Those having skill in the art will appreciate alternative embodiments of computer 20 for implementing the principles of the present invention.

Module 80 and module 90 are physically stored within ROM 63 and uploaded to RAM 64 whereby ROM 63 and RAM 64 are computer readable mediums electrically, mechanically, and/or chemically altered to carry a computer program product. In other embodiments of computer 60, module 80 and/or module 90 can be physically stored within other computer readable mediums such as one or more of the hard drives 74, or in a memory of another system computer (not shown) whereby module 80 and/or module 90 can be accessed over network 75 by computer 60. In other embodiments of computer 60, module 80 and module 90 can be fully or partially implemented with digital circuitry, analog circuitry, or both.

Module 80 conventionally generates or edits RMER 10 (FIG. 1A) in response to relevant data and information inputs from a user of computer 60, and/or in response to a retrieval of the relevant data and information from one or more of the disk drives 74, from a source via network 75, and/or from database 76. Those having ordinary skill in the art can appreciate the physical elements of computer 60 that are associated with an execution of module 80.

Figure 1A:
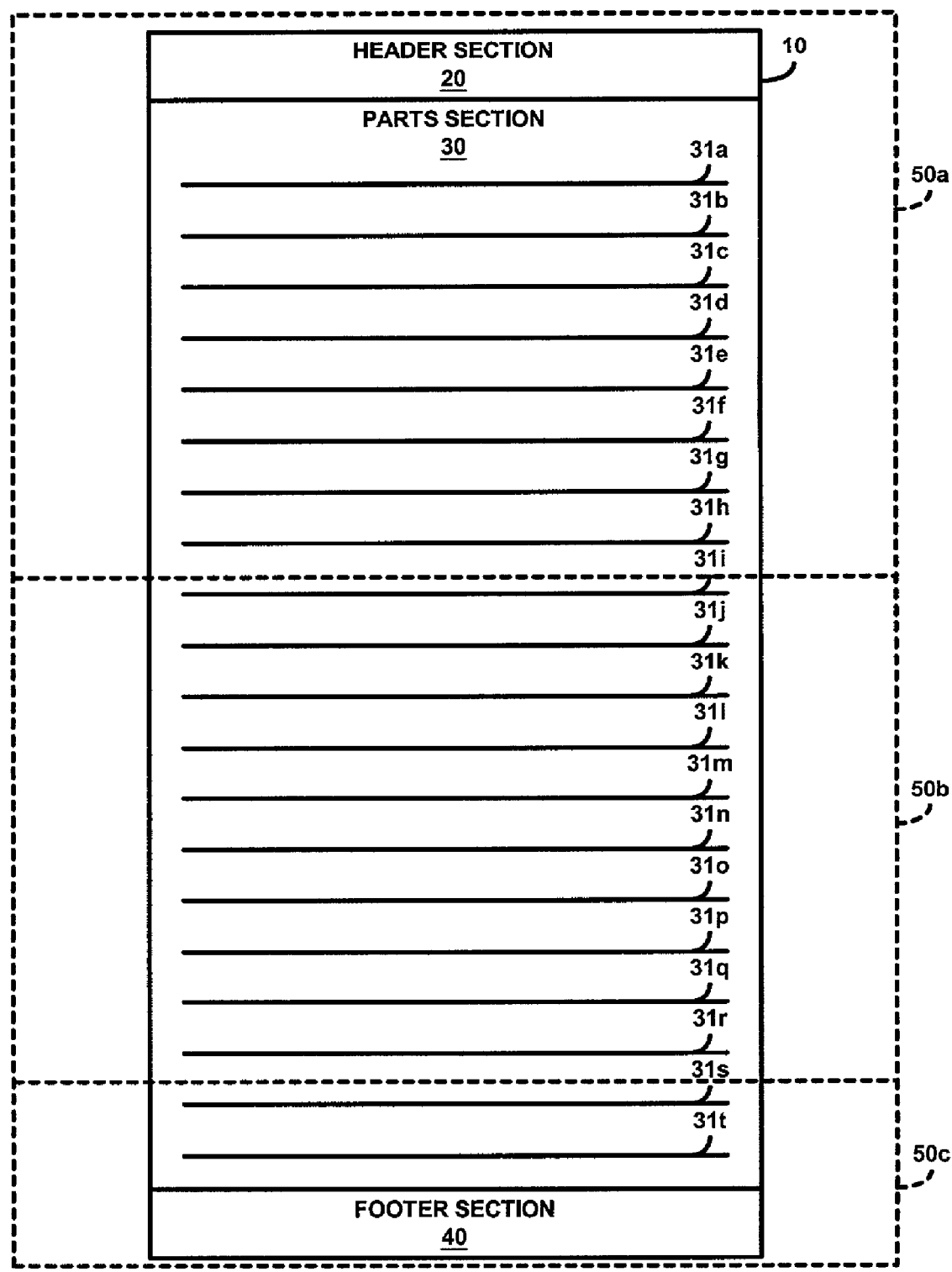
FIG. 1A is an illustration of a Returned Material Equipment Report (RMER) as known in the art.
Figure 1B:
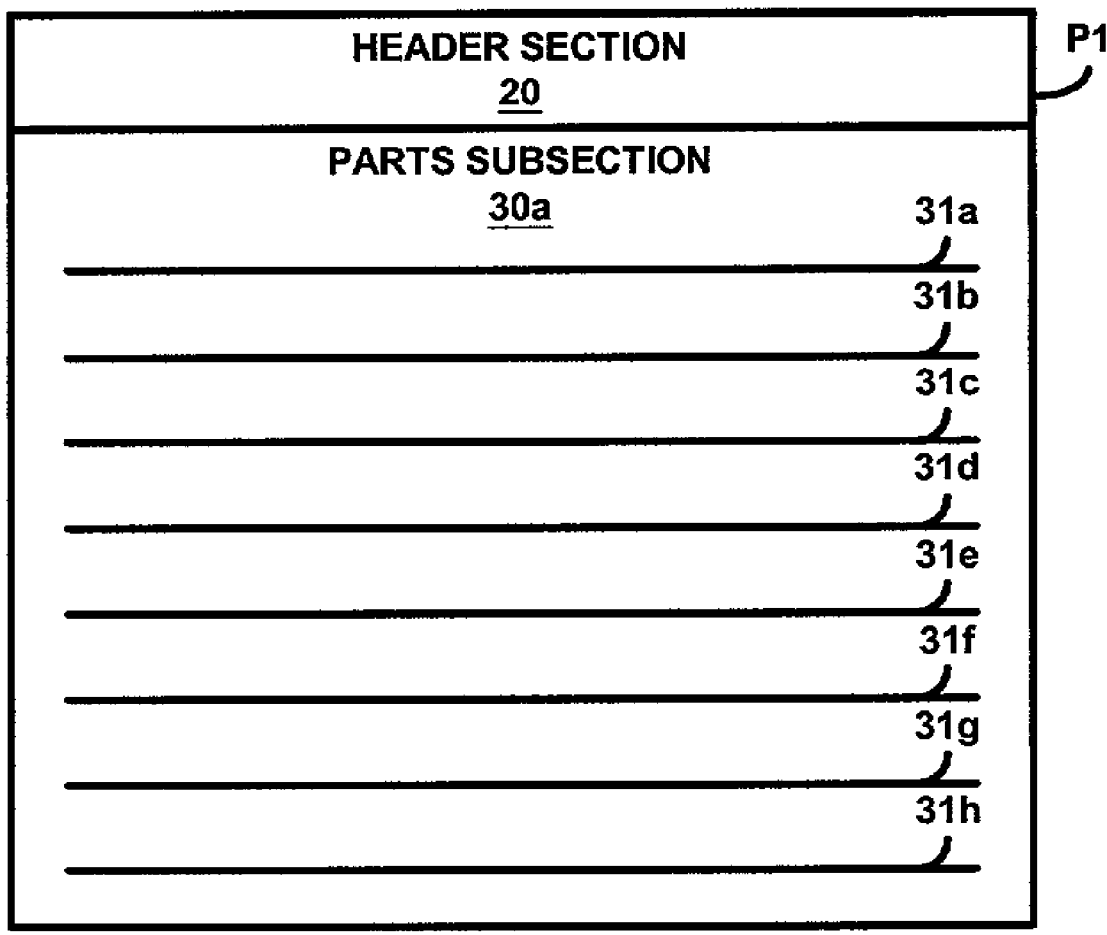
FIG. 1B is an illustration of a first printed page of the FIG. 1 RMER as known in the art.
Figure 1C:
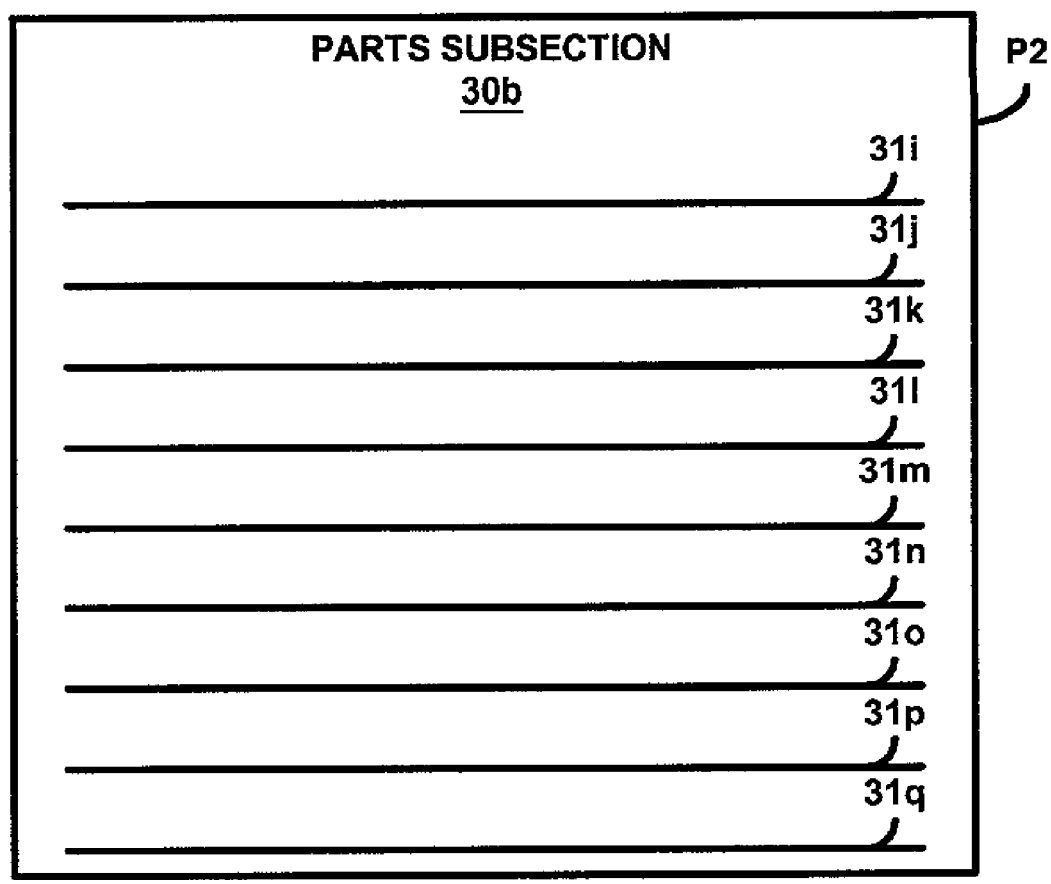
FIG. 1C is an illustration of a second printed page of the FIG. 1 RMER as known in the art.
Figure 1D:
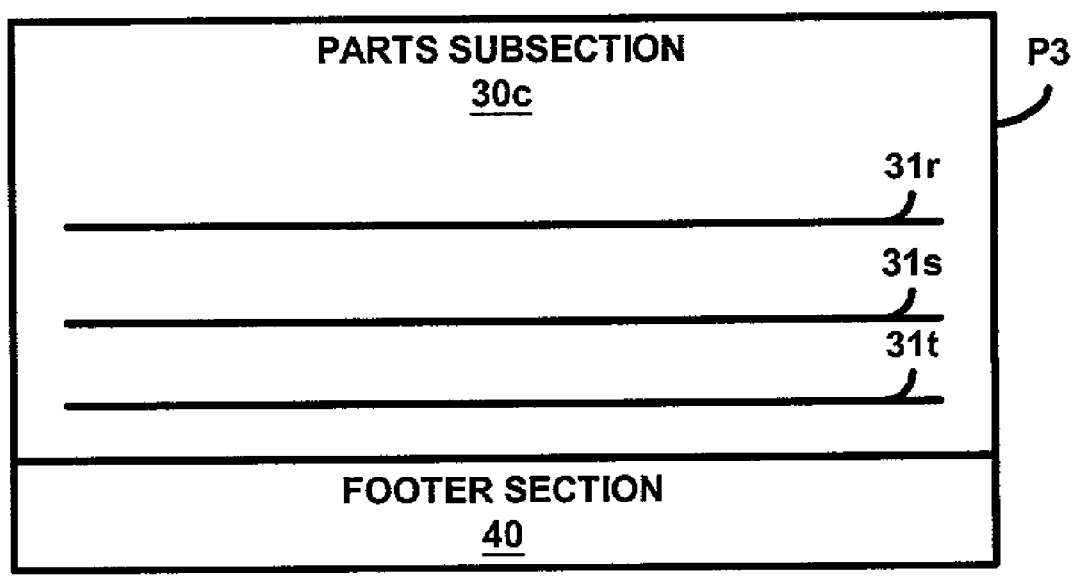
FIG. 1D is an illustration of a third printed page of the FIG. 1 RMER as known in the art.
Figure 1E:
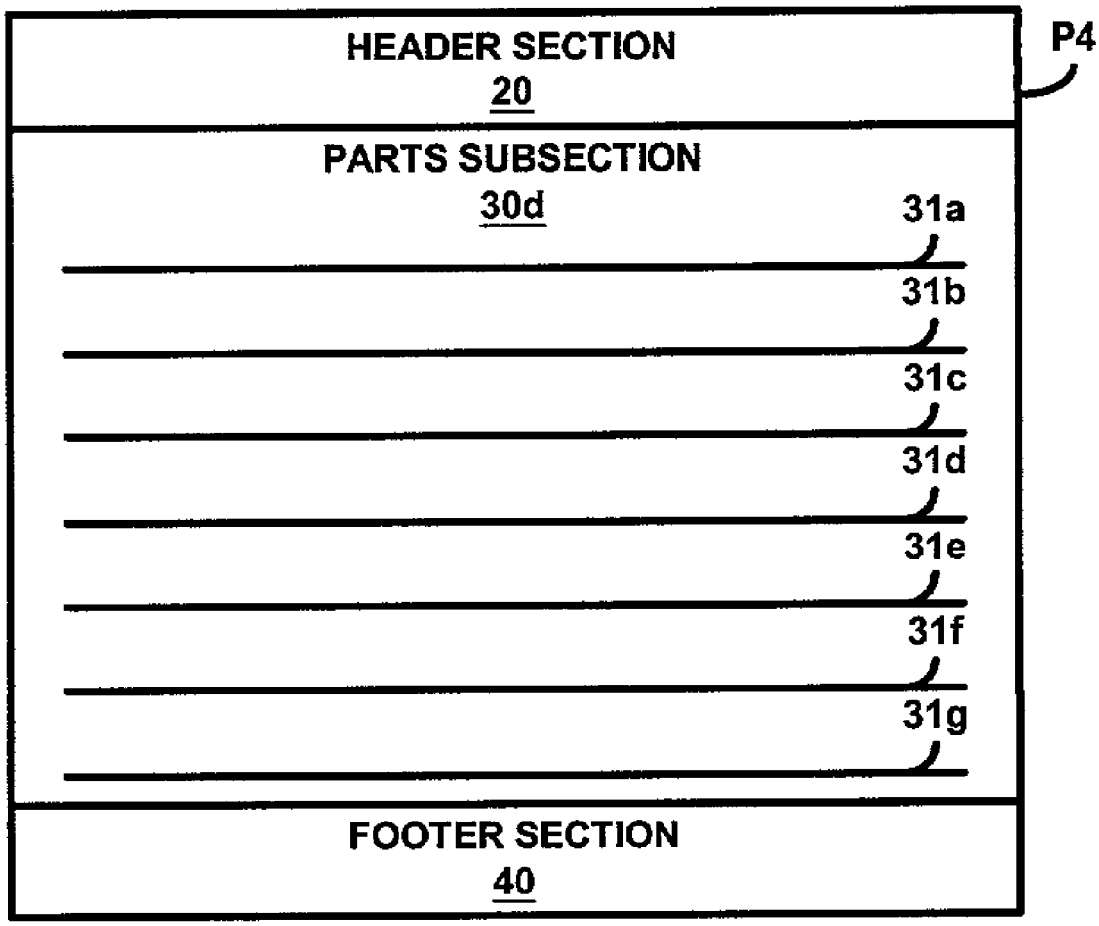
FIG. 1E is an illustration of a fourth printed page of the FIG. 1 RMER as known in the art.
Figure 1F:
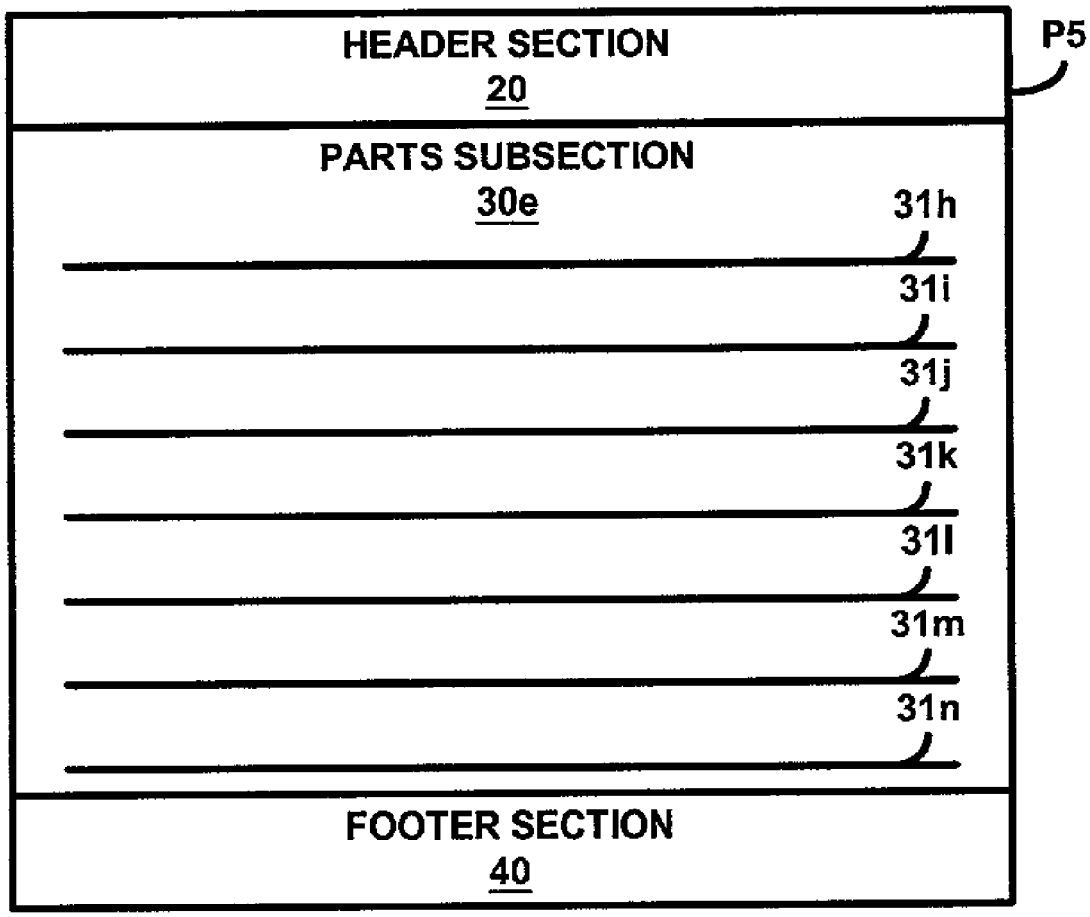
FIG. 1F is an illustration of a fifth printed page of the FIG. 1 RMER as known in the art.
Figure 1G:
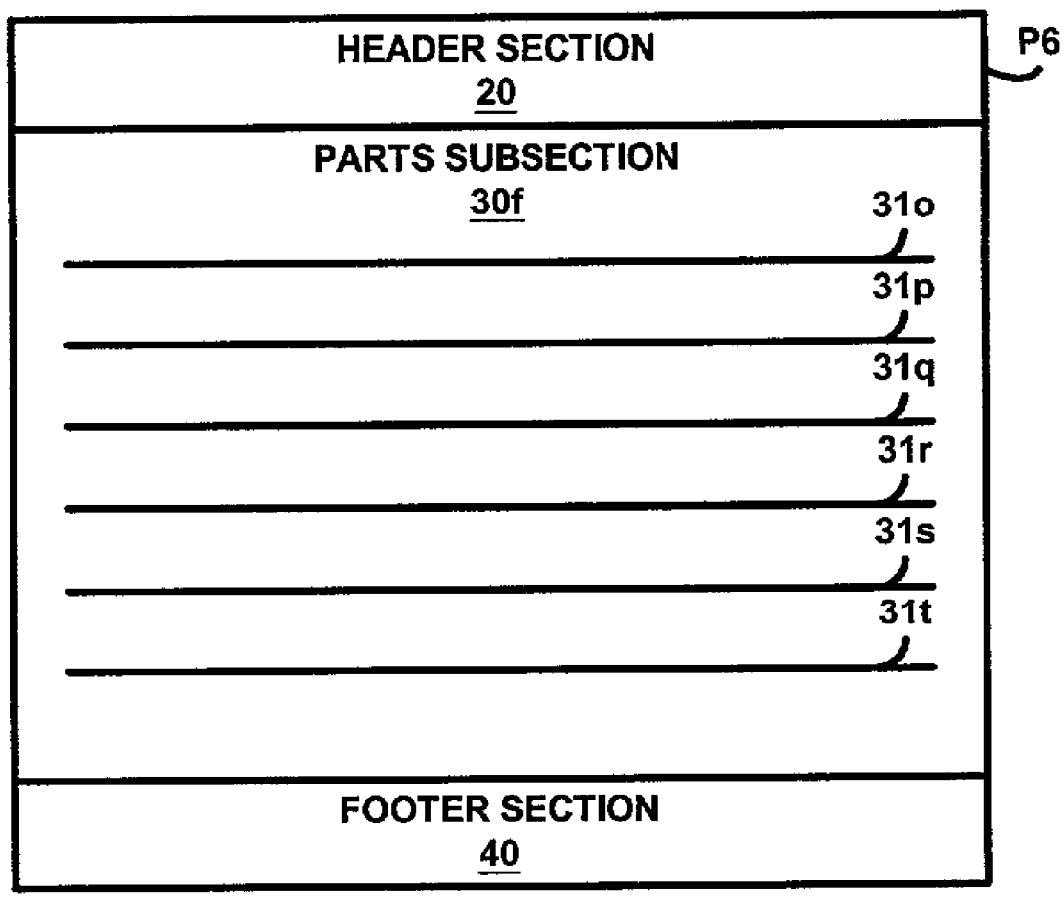
FIG. 1G is an illustration of a sixth printed page of the FIG. 1 RMER as known in the art.
Figure 5A:
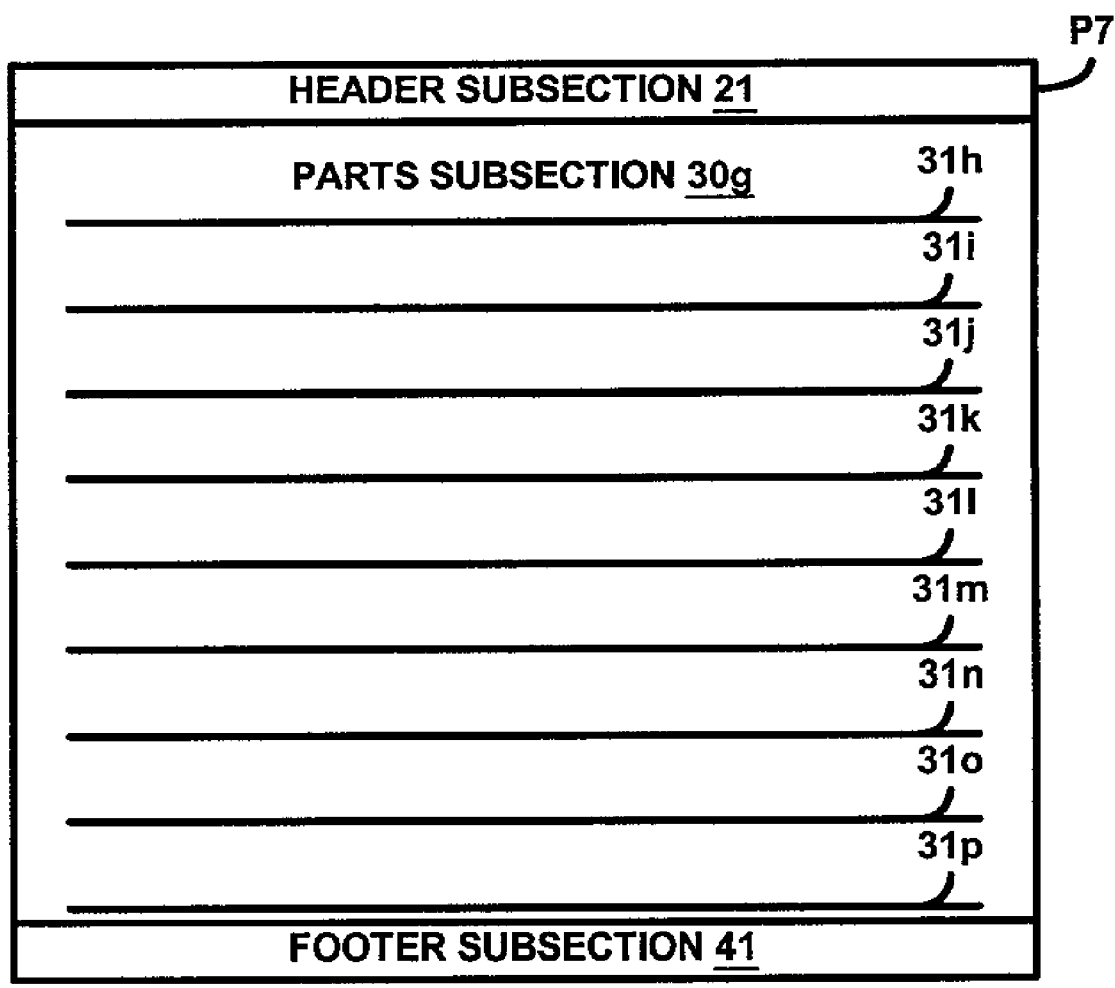
FIG. 5A is an illustration of a first printed page of the FIG. 1 RMER in accordance with the present invention.
Figure 5B:
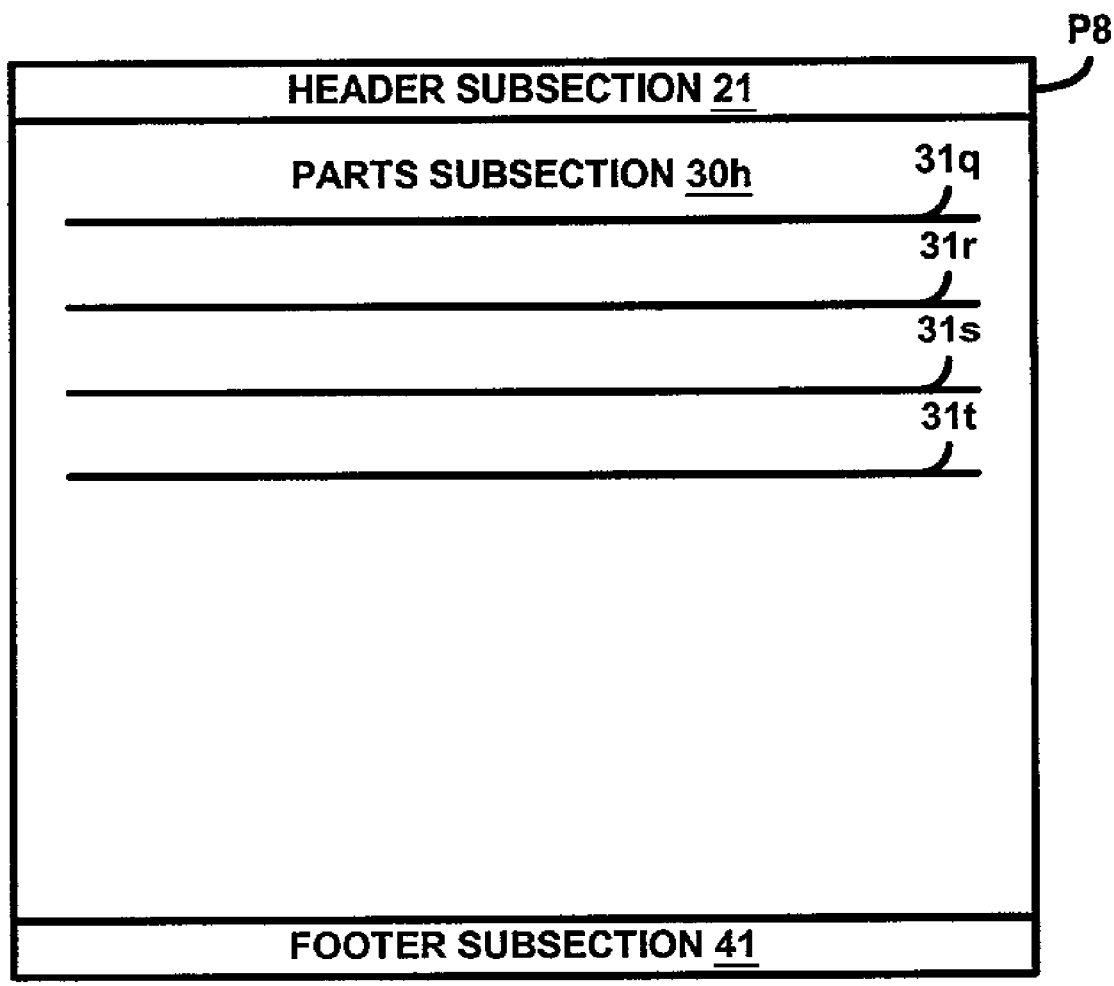
FIG. 5B is an illustration of a second printed page of the FIG. 1 RMER in accordance with the present invention.

Module 90 implements a routine 100 that will now be described herein in conjunction with a description of a generation of printed page P4 (FIG. 1E), as well as a generation of a printed page P7 and a printed page P8 as shown in FIGS. 5A and 5B, respectively, from RMER 10 (FIG. 1A). Those having ordinary skill in the art will appreciate the physical elements of computer 60 that are associated with the generation of the printed pages P4–P6 from RMER 10. Those having ordinary skill in the art will further appreciate the advantage of routine 100 in facilitating an unlimited input of line items 31 during a generation or modification of RMER 10.

Referring to FIGS. 1D, and 4–5B, during a stage S102 of routine 100, module 90 formats and prints header section 20 (FIG. 1A). Module 90 thereafter proceeds to a stage S104 of routine 100 to format and print a parts subsection listing X number or less of line items 31. The number X is 7 for purposes of describing the present invention whereby, during stage S104, module 90 formats and prints parts subsection 30$d$ (FIG. 1D) listing line items 31$a$–31$g$. However, in other embodiments of RMER 10 (FIG. 1A), the number X may vary as a function of the size of header section 20 and footer section 40 of RMER 10 as those having ordinary skill in the art will appreciate. Module 90 thereafter proceeds to a stage S106 to format and print footer section 40 (FIG. 1A). Page P4 (FIG. 1D) is the end result of the execution of stages S102–S106.

During a stage S108 of routine 100, module 90 ascertains whether the total quantity of line items 31 of RMER 10 exceeds the number X. The total quantity of line items 31$a$–31$t$ for purposes of describing the present invention is 20, whereby, during stage S108, module 90 determines the total quantity of line items 31 of RMER 10 exceeds the number X and proceeds to a stage S110 of routine 100. In other embodiments of RMER 10, the total quantity of line items 31 may be less than or equal to the number X with module 90 proceeding to terminate routine 100 with page P4 being the only printed page.

During stage S110, module 90 formats and prints a header section 21 as shown in FIG. 5A. Header section 21 represents a subset of the information represented by header section 20, and therefore is a reduced version of header section 20. In one embodiment, header section 21 represents information that clearly links header section 21 and header section 20 such as, for example, an invoice number. Module 90 thereafter proceeds to a stage S112 of routine 100 to format and print a parts subsection listing Y number or less of line items 31. The number Y is 9 for purposes of describing the present invention whereby, during stage S112, module 90 formats and prints a parts subsection 30g (FIG. 5A) listing line items 31h–31p. Module 90 thereafter proceeds to a stage S114 to format and print a footer subsection 41 as shown in FIG. 5A. Footer section 41 represents a subset of the information represented by footer section 40, and therefore is a reduced version of footer section 40. In one embodiment, footer section 41 represents information that links footer section 41 and footer section 40 such as, for example, a print date and a page number. Page P7 as shown in FIG. 5A is the end result of the first execution of stages S110–S114.

The number Y can vary as a function of the size of header subsection 21 and footer subsection 41 as those having ordinary skill in the art will appreciate.

During a stage S116 of routine 100, module 90 ascertains whether there are any unprinted line items 31. In one embodiment, module 90 compares the total quantity of line items 31a–31t to a summation of number X and number Y during stage S116. For purposes of describing the present invention, module 90 determines there are four (4) unprinted line items 31 from a comparison of 20 total line items and a sum of 16. Thus, module 90 proceeds to stage S110 of routine 100. In other embodiments of RMER 10, the total quantity of line items 31 may be less than or equal to the sum of the number X and Y with module 90 proceeding to terminate routine 100 after stage S116 and page P4 and page P7 being the printed pages.

During a second iteration of stage S110, module 90 formats and prints header section 21 as shown in FIG. 5B. Module 90 thereafter proceeds to stage S112 to format and print a parts subsection 30h listing line items 31q–31t as shown in FIG. 5B. Module 90 thereafter proceeds to a stage S114 to format and print footer subsection 41 as shown in FIG. 5B. Page P8 as shown in FIG. 5B is the end result of the second execution of stages S110–S114.

During a second iteration of stage S116, module 90 ascertains whether there are any unprinted line items 31. In one embodiment, module 90 compares the total quantity of line items 31a–31t to a summation of number X and number 2Y during the second iteration of stage S116. For purposes of describing the present invention, module 90 determines there are not unprinted line items 31 from a comparison of 20 total line items and a sum of 23. Thus, module 90 proceeds to terminate routine 100 with page P4, page P7 and page P8 being the printed pages.

In other embodiments of routine 100, stages S102–S106 and stages S110–S114 may be designed to format the associated sections, and routine 100 may include an additional stage for printing each formatted section.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for printing a computer generated report including a header section presenting a first set of information, a parts sections listing one or more line items, and a footer section presenting a second set of information, said method comprising:
   printing a first report page including
      the header section,
      a first parts subsection listing a first quantity of line items, said first quantity being less than or equal to a first number, and
      the footer section; and
   printing a second report page when a total quantity of line items listed in the parts section exceeds said first number, said second page including
      a header subsection presenting a portion of the first set of information,
      a second parts subsection listing a second quantity of line items, said second quantity being less than or equal to a second number, and
      a footer subsection presenting a portion of the second set of information.

2. The method of claim 1, further comprising:
   printing a third report page when a total quantity of line items listed in the parts section exceeds a summation of said first number and said second number, said third page including
      said header subsection,
      a third parts subsection listing a third quantity of line items, said third quantity being less than or equal to said second number, and
      said footer subsection.

3. A system for printing a computer generated report including a header section presenting a first set of information, a parts sections listing one or more line items, and a footer section presenting a second set of information, said system comprising:
   a first print means for printing a first report page including
      the header section,
      a first parts subsection listing a first quantity of line items, said first quantity being less than or equal to a first number, and
      the footer section; and
   a second print means for printing a second report page when a total quantity of line items listed in the parts section exceeds said first number, said second page including
      a header subsection presenting a portion of the first set of information,
      a second parts subsection listing a second quantity of line items, said second quantity being less than or equal to a second number, and
      a footer subsection presenting a portion of the second set of information.

4. The system of claim 3, further comprising:
   a third print means for printing a third report page when a total quantity of line items listed in the parts section exceeds a summation of said first number and said second number, said third page including
      said header subsection,
      a third parts subsection listing a third quantity of line items, said third quantity being less than or equal to said second number, and
      said footer subsection.

5. A computer program product in a computer readable medium for printing a computer generated report including a header section presenting a first set of information, a parts sections listing one or more line items, and a footer section presenting a second set of information, said computer program product comprising:
- a first computer readable code for printing a first report page including
  - the header section,
  - a first parts subsection listing a first quantity of line items, said first quantity being less than or equal to a first number, and
  - the footer section; and
- a second computer readable code for printing a second report page when a total quantity of line items listed in the parts section exceeds said first number, said second page including
  - a header subsection presenting a portion of the first set of information,
  - a second parts subsection listing a second quantity of line items, said second quantity being less than or equal to a second number, and
  - a footer subsection presenting a portion of the second set of information.

6. The computer program product of claim 5, further comprising:
- a third computer readable code for printing a third report page when a total quantity of line items listed in the parts section exceeds a summation of said first number and said second number, said third page including
  - said header subsection,
  - a third parts subsection listing a third quantity of line items, said third quantity being less than or equal to said second number, and
  - said footer subsection.

* * * * *